US012392487B2

(12) United States Patent
Charhut et al.

(10) Patent No.: US 12,392,487 B2
(45) Date of Patent: Aug. 19, 2025

(54) SYSTEM AND MECHANISM FOR BOTTOM ASH FEED REGULATION TO A LOW CAPACITY CONVEYOR

(71) Applicant: United Conveyor Corporation, Waukegan, IL (US)

(72) Inventors: Daniel Charhut, Lake Bluff, IL (US); Keith Johnson, Hawthorn Woods, IL (US); Robert LeDain, Fox Lake, IL (US); Ronald Bugar, Chicago, IL (US); Slawomir Sadowski, Bensenville, IL (US)

(73) Assignee: United Conveyor LLC, Waukegan, IL (US)

(*) Notice: Subject to any disclaimer, the term of this patent is extended or adjusted under 35 U.S.C. 154(b) by 528 days.

(21) Appl. No.: 17/567,205

(22) Filed: Jan. 3, 2022

(65) Prior Publication Data

US 2022/0120439 A1 Apr. 21, 2022

Related U.S. Application Data

(63) Continuation-in-part of application No. 16/458,814, filed on Jul. 1, 2019.

(51) Int. Cl.
*F23J 1/02* (2006.01)
*B02C 13/10* (2006.01)
*B02C 13/286* (2006.01)

(52) U.S. Cl.
CPC ................. *F23J 1/02* (2013.01); *B02C 13/10* (2013.01); *B02C 2013/28609* (2013.01); *B02C 2013/28636* (2013.01); *F23J 2700/001* (2013.01); *F23J 2900/01003* (2013.01)

(58) Field of Classification Search
CPC ........... B02C 2013/28636; B02C 2013/28609; B02C 13/10; F23J 2900/01003; F23J 1/02
See application file for complete search history.

(56) References Cited

U.S. PATENT DOCUMENTS

| | | | | | |
|---|---|---|---|---|---|
| 2,110,850 | A * | 3/1938 | Symons | B02C 13/09 | 241/62 |
| 2,280,902 | A * | 4/1942 | Ellison | B02C 13/00 | 241/4 |
| 2,316,124 | A * | 4/1943 | Sheldon | B02C 13/288 | 241/51 |
| 2,468,321 | A * | 4/1949 | Bland | B02C 13/00 | 241/24.1 |
| 4,361,290 | A * | 11/1982 | Francis | B02C 13/286 | 241/189.1 |

(Continued)

FOREIGN PATENT DOCUMENTS

| | | | |
|---|---|---|---|
| EP | 1818611 | A2 | 8/2007 |
| JP | S61116214 | A | 6/1986 |
| JP | 2011012902 | A | 1/2011 |

*Primary Examiner* — Bobby Yeonjin Kim
(74) *Attorney, Agent, or Firm* — Vitale, Vickrey, Niro, Solon & Gasey LLP

(57) ABSTRACT

A system and mechanism for bottom ash flow turndown from a hopper, through a crusher, and to a conveyor, the system including a fixed flow restrictor and a variable speed side discharge crusher to modulate bottom ash flow in the absence of gate or valve flow from a hopper, the conveyor providing a signal corresponding to an overfeed condition to enable a controller to operate the crusher and/or the conveyor to eliminate overfeed conditions.

4 Claims, 4 Drawing Sheets

(56) References Cited

U.S. PATENT DOCUMENTS

| | | | | |
|---|---|---|---|---|
| 4,697,743 | A * | 10/1987 | Bjorck | B02C 21/00 241/97 |
| 5,255,615 | A | 10/1993 | Magaldi | |
| 5,683,044 | A * | 11/1997 | Gueldenpfennig | B02C 13/04 241/73 |
| 5,887,804 | A * | 3/1999 | Hansen | B02C 19/0087 241/102 |
| 6,217,442 | B1 * | 4/2001 | Schmidt | B02B 3/08 241/9 |
| 10,124,968 | B2 | 11/2018 | Zotti | |
| 2010/0001110 | A1 * | 1/2010 | Tschantz | B02C 13/284 241/165.5 |
| 2011/0226194 | A1 | 9/2011 | Mooney | |

* cited by examiner

SYSTEM AND MECHANISM FOR BOTTOM ASH FEED REGULATION TO A LOW CAPACITY CONVEYOR

RELATED APPLICATION DATA

This application is a continuation in part of and claims priority to utility patent application Ser. No. 16/458,814 filed on Jul. 1, 2019.

FIELD OF INVENTION

The present disclosure is directed towards an improved system and method for enabling a high turndown ratio for a bottom ash handling system. More specifically, the present disclosure is directed towards a structure for modulating the flow capacity between a hopper, a crusher and a conveyor to provide superior processing capability.

BACKGROUND OF THE INVENTION

The present invention relates to a wet bottom ash processing system. As mined, coal used to provide an energy source for a steam boiler contains varying quantities of mineral matter which, when the coal is burned, results in creation of the combustible residue known as ash. As is known, two types of ash result from operation of solid fuel-fired boilers, namely, bottom ash and fly ash. Bottom ash is slag that builds up on the heat absorbing surfaces of a furnace and that eventually falls by its own weight or as a result of load changes or the blowing of soot.

In the prior art, systems used to remove bottom ash from beneath a solid fuel-fired boiler generally fall into two categories; namely, wet or dry. The wet category consists of devices that employ a water filled tank to cool the ash and allow removal either mechanically and/or with a hydraulic conveying system. An example system for removing wet bottom ash includes a hopper for collecting the ash, a crusher for grinding the ash; and a conveyor for removing and/or dewatering the ash. One challenge that exists with such systems is the comparative capacity for each subsystem varies greatly. That is, while an example hopper may have a potential throughput of 200 tons per hour, the crusher may only process 100 tons per hour, and the conveyance subsystem may only process 10 tons per hour. In such an example, the system needs to support a 20:1 turndown ratio of ash in order to avoid a bottleneck or clog in the system.

DESCRIPTION OF THE PRIOR ART

Other prior art approaches are known to exist to attempt to address the modulation of such process flow. For instance, U.S. Pat. No. 5,255,615 (Magaldi). discloses a system for discharging bottom ash from steam-producing boilers that includes an ash hopper with a bottom discharge controlled by a gate valve. Still another approach is disclosed and claimed in U.S. Pat. No. 10,124,968 B2 (Zotti et al.) which calls for a bottom gate for controlling the flow of ash from the hopper. However, these approaches in fact create problems stemming from the use of the bottom gate to control the flow of ash results in arching. Arching (also known as bridging) occurs when an obstruction in the shape of an arch or a bridge forms over the outlet as a result of the material's cohesive strength. When fly ash forms a stable arch above the outlet, discharge is prevented and a no-flow condition results.

Existing active flow control from such gate or valve mechanisms require undesirable frequent adjustments and/or clearance steps to compensate for buildup due to the partial opening or closing of such valves and gates. That is, the partial closing of such mechanisms increases the likelihood of larger particles which would otherwise pass from the hopper blocking the bottom gate, which increases the risk of arching. In arching, the material forms an arch (or a bridge) above the gate that prevents or limits further flow.

Such existing protocols for dealing with arching are unsatisfactory insofar as they necessitate a never ending cycle to adjust for limitations of the system. That is, in existing bottom ash feeders, the service protocol entails opening the bottom gate to the hopper to clear the existing arch. This step results in overfeeding, i.e., overloading the input to the conveyor system leading from the hopper. In response to overfeeding of the conveyor system, the bottom gate is closed to reduce overfeeding, which in turn generates further arching.

Thus, there is a need to provide a flow turndown mechanism that effectively controls ash independent without of any gate control so as to avoid flow control problems such as arching.

A further problem arises from the use of low capacity conveyors now used with the bottom ash control systems. Originally, bottom ash hoppers and related control mechanisms were designed to work as batch systems, which were acceptable so long as conveyance system from the hopper could handle the volume output of bottom ash. However, with the more recent installation and use of low capacity conveyors with such systems, the bottom ash processing equipment has to run continuous operations, and try to control feed to account for the volumetric "choke point" created by the low capacity conveyor. Such existing bottom ash processing systems were not designed to operate in such a manner.

Thus, there is a need to adjust the flow of ash to a conveyor to enable continuous operations in a comparatively low (relative to the hopper and crusher capacity) of a bottom ash processing system.

Definition of Terms

The following terms are used in the claims of the patent as filed and are intended to have their broadest plain and ordinary meaning consistent with the requirements of the law.

A "bottom gate" refers generally to an mechanism on the opening on the hopper leading to the crusher which closes the hopper when not operating (e.g., for cleaning or maintenance) but does not control the flow of bottom ash from the hopper when operating, thereby maintaining a constant fixed level of opening so as to avoid aggravation of potential arching problems.

Where alternative meanings are possible, the broadest meaning is intended. All words used in the claims set forth below are intended to be used in the normal, customary usage of grammar and the English language.

Objects and Summary of the Disclosure

The present disclosure solves existing needs for improved turndown in bottom ash applications by providing a fixed mechanism for controlling bottom ash received from a hopper bottom gate. In a first embodiment of the disclosure, the system includes a variable speed side discharge crusher operating in conjunction with a offset duct for controlling the output of the bottom ash received from the hopper. Such a configuration would, in effect, turn the crusher into a pumping device to control bottom ash flow. Still another embodiment would entail an orifice plate between the bottom gate and the crusher so as to provide a fixed restriction decreasing the inlet of the crusher. Yet another embodiment would entail a fixed extended wear plate beneath the bottom gate and extending into the crusher section thus decreasing the inlet of the crusher.

Thus, it can be seen that one object of the present disclosure is to provide a mechanism and configuration for controlling the flow of ash received from a hopper for processing and conveyance.

Another object of the present disclosure is to provide a mechanism for enabling a turndown ratio for bottom ash being processed from a hopper.

Still another object of the present invention is to provide a fixed mechanism to reduce or eliminate arching problems in controlling ash flow from a hopper.

Yet another object of the present invention is to provide a flow turndown mechanism for receiving ash from a hopper to be crushed, wherein the flow control mechanism does not involve the bottom gate controlling flow of the ash.

Still another object of the present invention is to provide a control scheme based upon a conveyor signal, such as a conveyor drive motor signal, to identify and eliminate overfeed conditions.

It will be understood that not every claim will employ each and every object as set forth above in the operation of the present invention. However, these and other objects, advantages and features of the invention will be apparent from the following description of the preferred embodiments, considered along with the accompanying drawings.

DETAILED DESCRIPTION OF THE INVENTION

Set forth below is a description of what is currently believed to be the preferred embodiment or best examples of the invention claimed. Future and present alternatives and modifications to this preferred embodiment are contemplated. Any alternatives or modifications which make insubstantial changes in function, in purpose, in structure or in result are intended to be covered by the claims in this patent.

Figure 1:
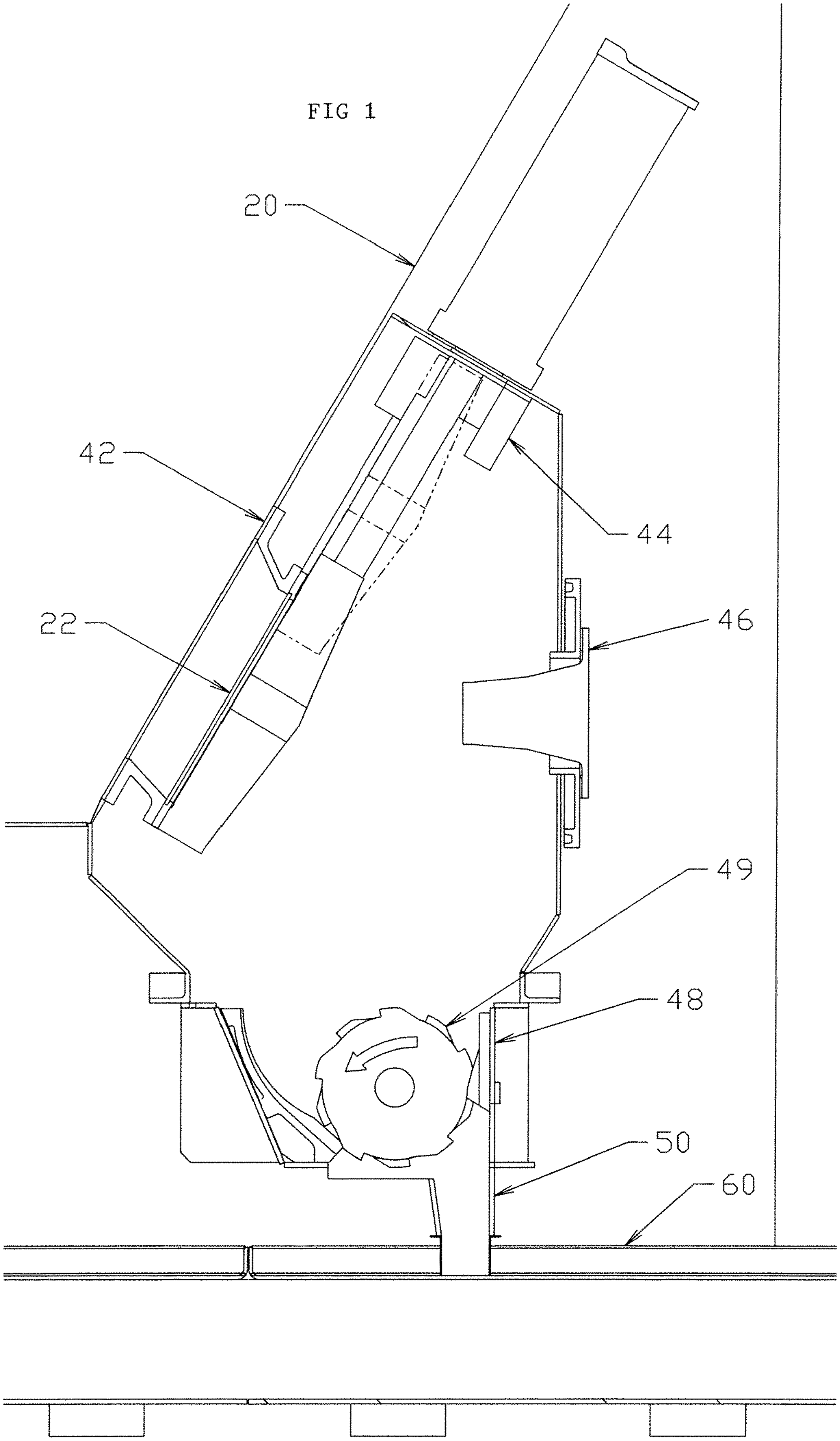
FIG. 1 shows an exposed view of an example bottom ash processing system including a side bottom crusher assembly in accord with an embodiment of the present invention.
Figure 2:
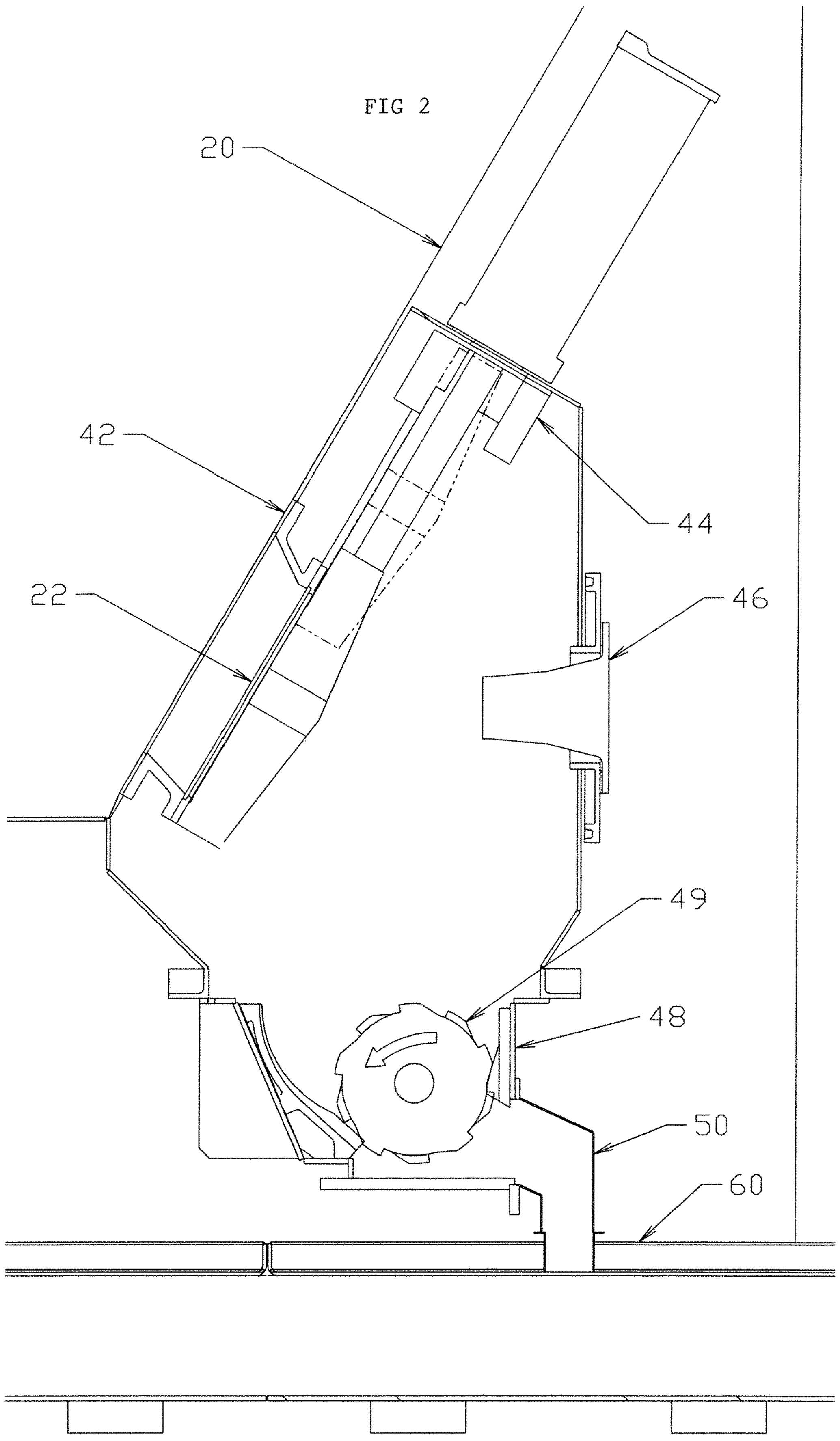
FIG. 2 shows an exposed view of an example bottom ash processing system including a side crusher assembly in accord with an embodiment of the present invention.

FIGS. 1 and 2 shows a bottom ash processing system 10 in accord with an embodiment of the present invention. The system includes hopper 20, crusher 40 and conveyor 60 subunits. The 20 receives bottom ash from one or more boilers (not shown), which are displaced through a bottom gate 22 (typically an 18" or 24" square opening). The bottom gate preferably does not modulate or otherwise close unless the machine is turned off (e.g., for maintenance or cleaning). The bottom ash then empties into a crusher subunit 40 where the larger particles are reduced in size prior to the bottom ash being placed on a conveyor 60 for further processing (e.g., dewatering) and transport or storage. The crusher 40 includes a variable speed controller to adjust the flow rate of bottom ash therethrough. This control mechanism, in effect, turns crusher 40 into a pump so as avoid overfeeding of the conveyor 60.

As shown in FIG. 2, a first preferred embodiment of the crusher subassembly 40 includes a diluting spray pipe 41, a seat 42, a rail 44 and a portal 46, and crusher 48 and an offset conduit 50. The diluting spray pipe 41 is preferably located between the hopper and the rest of the crusher subassembly. The flow of the diluting spray pipe 41 may be adjusted so as to provide a coarse ash feed control. The seat 42 and rail 44 mate with the hopper 20 and the bottom gate to enable a mating arrangement between the hopper 20 and crusher 40 subassemblies. The portal 46 enables an operator to manually clear any occlusion in the bottom gate with a rod or similar tool. The crusher 48 includes a series of rotating teeth 49 to capture, grind and break down the larger bottom ash particles for better processing. In this embodiment the crusher 48 is a side discharge crusher which pushes the bottom ash in a horizontal direction (relative to ground) and into the offset conduit where the bottom ash can be picked up by the conveyor subassembly 60 for transport and further processing. The crusher has a variable speed control capability which acts as a "fine control" of the feed rate operating in conjunction with the dilution spray pipe 41 to control the feed rate to the conveyor subassembly and enable continuous operations. In this way, the configuration of the crusher subassembly using the side discharge crusher receiving and controlling the bottom ash in effect turns the subassembly into a pumping device providing turndown for the higher flow of bottom ash received from the hopper 20.

Those of skill in the art having the disclosure of the present invention will further understand that the controller of crusher 40 can work in concert with signals received from the conveyor 60 to determine capacity issues for adjusting the flow through the crusher 40.

For instance, the controller of crusher 40 can receive feedback on the drive motor current level of the conveyor 60 as a signal to determine whether an overfeed condition exists for the conveyor 60. In one example, a current measurement at one level for the drive motor (e.g., 10 A) might reflect no ash load, while a higher current measurement (e.g., 12 A) might reflect a full ash load for conveyor 60. In the event that the conveyor 60 provides a signal reflecting full load to crusher 40, the controller in the crusher 40 would institute a series of steps to address the overcapacity without modulating the hopper gate to control bottom ash flow.

One such conveyor signal derived control protocol would be as follows. If the signal provided by the conveyor 60 correlates to the full load value (i.e., indicating a potential overfeed), the controller would first switch the conveyor(s) to a higher speed to increase the rate of bottom ash removal. In addition, the controller would cycle the crusher 40 on and off a series of times (e.g., 5 times) and then dwell, and continue this process for a desired period (e.g., 20 minutes). If, in response to this protocol the conveyor is not providing a drive motor signal corresponding to "no-load," then the controller would turn off the crusher 40 until such a no-load signal is provided. Once a no-load signal is provided, the conveyor 60 can be restarted at a lower speed and crusher 40 can be turned on again, with this control sequence being repeated in response to a further full load signal.

This example of controller protocols set forth above using the drive motor amperage signal operates on a conservative basis to avoid a boiler shut down. Those of skill in the art will understand that the controller of crusher 40 can be reprogrammed to change the number of on/off cycles in response to a full load signal, or in the event of a system including multiple crushers 40 and multiple conveyors 60 to use an overfeed protocol which is limited to only the crusher whose conveyor is signaling an overfeed condition. A further, less conservative alternate control protocol would be to enable a restart based upon drive motor amperage signal decrease that was reduced, but not yet corresponding to a. "no load" value. In addition, those of skill will understand that the above example refers to a controller that is part of crusher 40, other controller architectures can be used, including but not limited to one or more separate controllers, a federated controller architecture and/or one or more separate computers or servers to enable a overfeed control protocol.

These control protocols will be understood to enable a more efficient system 10, lower wear on system components, such as the conveyor 60. In particular an optimal, an optimal control scheme would enable performance at low speed of the conveyor 60 to be run the most, or to have the most hours out of a 24-hour operational cycle run at low speed. Such a control scheme would reduce wear to a minimum, as wear is proportional to the square of the speed.

Figure 3:
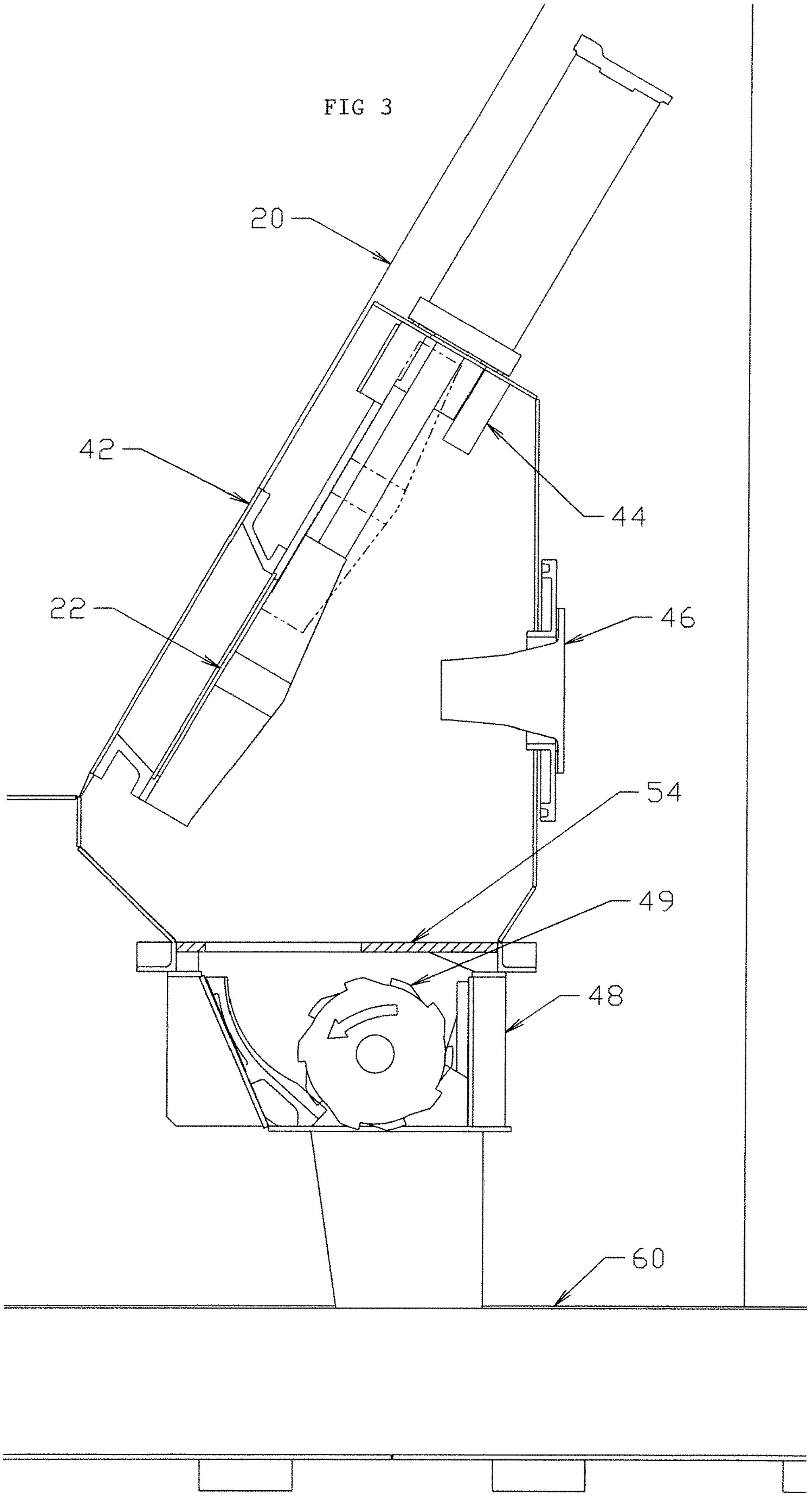
FIG. 3 shows an exposed side view of a crusher assembly with an orifice plate in accord with an embodiment of the present invention.
Figure 4:
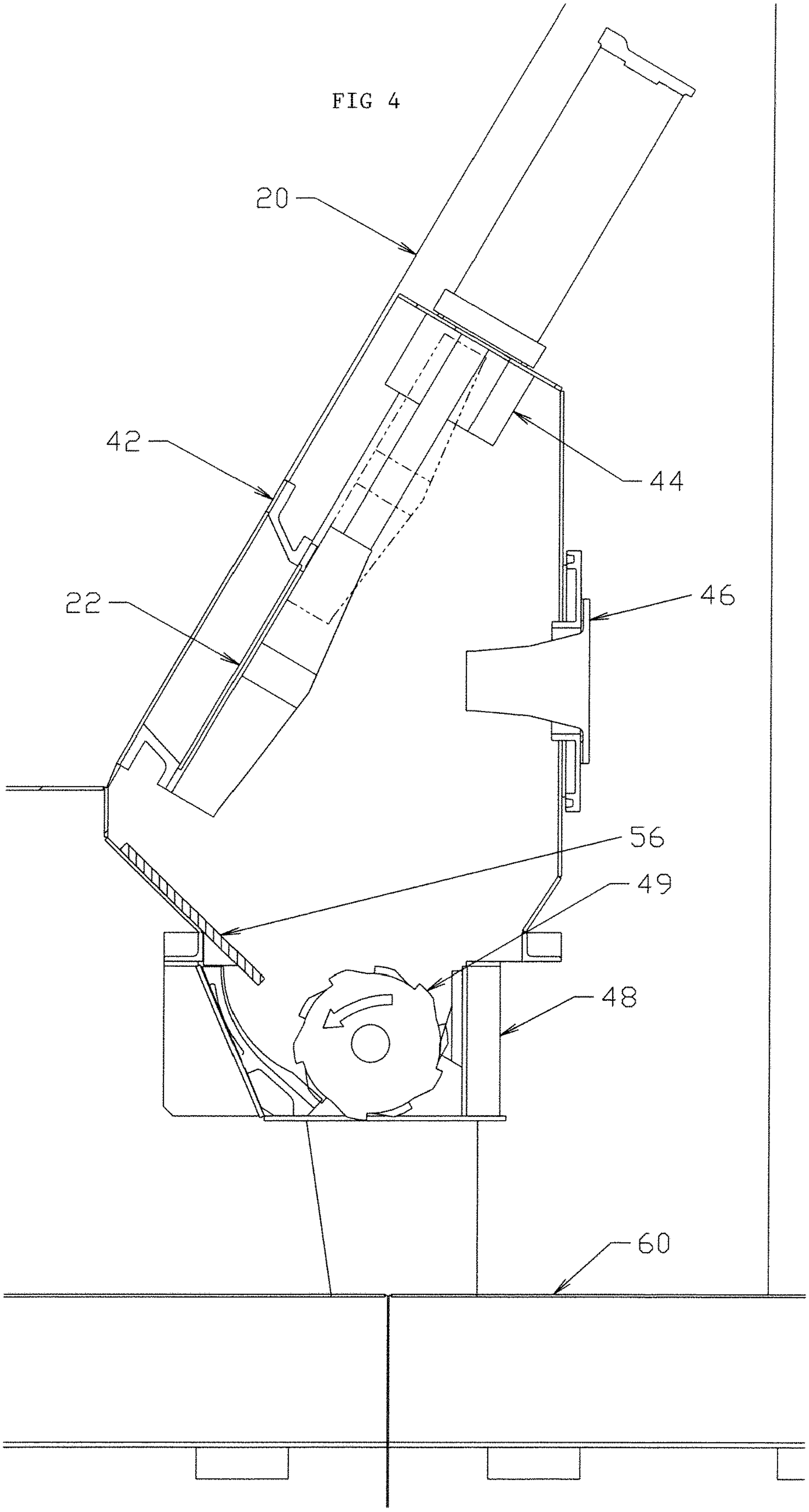
FIG. 4 shows an exposed side view of a crusher assembly with an extended wear plate in accord with an embodiment of the present invention.

As shown in FIGS. 3-4, other geometries of fixed flow restrictors can be used with the crusher subassembly 40 to enable similar turndown functions in bottom ash processing between the subassemblies. For instance, as shown in FIG. 3, the crusher subassembly 40 can employ an orifice plate 54 decreases the inlet of the crusher 48, thus enhancing the turndown of the ash flow received from hopper 20. This greatly decreases the flow of fine bottom ash particles through the back of the crusher 48, but still allows larger particles into the crushing zone. Still another option is shown in FIG. 4, wherein an extended wear section element 56 is extended next to the crusher 48, thus moving the crushing zone to the top of the crusher from the bottom of the crusher, thereby allowing the crusher 48 to crush and meter so as to slow down flow.

The above description is not intended to limit the meaning of the words used in the following claims that define the invention. For instance, one of skill in the art would understand that the crusher 40 of the most preferred embodiment of the present invention includes a robust controller with the potential for a large number of on/off cycles, such as a hydraulic controller. However alternative embodiments of controllers, such as a variable frequency drive controllers could be used if one were to account for the limitations imposed with the "soft start" aspects of such a controller in a crusher application. Likewise, while the present invention is intended to render unnecessary the actuation of the bottom gate for the hopper in controlling bottom ash flow, alternative embodiments of the present invention could combine the crusher and conveyor control scheme as described with additional hopper control mechanisms. Rather, it is contemplated that future modifications in structure; function or result will exist that are not substantial changes and that all such insubstantial changes in what is claimed are intended to be covered by the claims.

We claim:

1. A system for providing the efficient turndown of high flow bottom ash from a hopper, the system comprising:

a. a bottom gate having a single fixed opening for bottom ash to move therethrough;

b. a crusher subassembly including a side discharge crusher and offset conduit, the side discharge crusher receiving bottom ash from the bottom gate and pumping the bottom ash through the offset conduit; and c. a conveyor subassembly for receiving the bottom ash from the offset conduit and transporting the bottom ash away from the hopper subassembly, the conveyor further including a drive motor providing a drive motor amperage signal;

d. a controller connected to the conveyor and the crusher, the controller increasing the speed of the drive motor and selectively turning the crusher on and off in response to a drive motor amperage signal corresponding to an overfeed condition.

2. The system for providing the efficient turndown of high flow bottom ash from a hopper of claim 1, wherein the crusher subassembly includes at least one fixed plate, the at least one fixed plate receiving bottom ash from the bottom gate and being orthogonal to the ash flowing from the bottom gate, wherein the at least one fixed plate redirects ash flow prior to entering the crusher.

3. The system for providing the efficient turndown of high flow bottom ash from a hopper of claim 1, wherein the controller further increases the speed of the drive motor and selectively turning the crusher on and off in response to a drive motor amperage signal corresponding to an overfeed condition.

4. The system for providing the efficient turndown of high flow bottom ash from a hopper of claim 1, wherein the controller further selectively modulates the speed of the crusher in response to a drive motor amperage signal corresponding to an overfeed condition.

* * * * *